(12) United States Patent
Kamachi et al.

(10) Patent No.: US 7,297,433 B2
(45) Date of Patent: Nov. 20, 2007

(54) FUEL CELL

(75) Inventors: Atsushi Kamachi, Saitama (JP);
Shunsuke Itami, Saitama (JP); Hitoshi Okanobori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 454 days.

(21) Appl. No.: 10/991,094

(22) Filed: Nov. 18, 2004

(65) Prior Publication Data
US 2005/0130028 A1    Jun. 16, 2005

(30) Foreign Application Priority Data
Nov. 21, 2003   (JP)   ............... 2003-392201

(51) Int. Cl.
*H01M 2/00* (2006.01)
(52) U.S. Cl. ...................................... 429/34
(58) Field of Classification Search ............. 429/30, 429/44
See application file for complete search history.

(56) References Cited
U.S. PATENT DOCUMENTS
7,138,206 B2 * 11/2006 Yoshida et al. ............. 429/129

2004/0157112 A1 * 8/2004 Suzuki et al. ............... 429/44

FOREIGN PATENT DOCUMENTS
JP    2000-58072    * 2/2000
JP    2006-351466   * 12/2006

* cited by examiner

*Primary Examiner*—Patrick Joseph Ryan
*Assistant Examiner*—Thomas H. Parsons
(74) *Attorney, Agent, or Firm*—Arent Fox LLP

(57) ABSTRACT

A fuel cell includes a laminated, plate-shaped membrane electrode assembly and first and second separator plates sandwiching the membrane electrode assembly. The membrane electrode assembly includes a polymer electrolyte membrane; first and second electrode layers sandwiching the polymer electrolyte membrane; and first and second gas-diffusion layers disposed on an outer side of the electrode layers, respectively. The first and second gas-diffusion layers are made of an air-permeable metallic material. An arithmetic average roughness Ra of a surface of the air-permeable metallic material on the side contacting one of the electrode layers is in a range of $0.1 \ \mu m \leq Ra \leq 1.0 \ \mu m$.

14 Claims, 8 Drawing Sheets

FUEL CELL

RELATED APPLICATION DATA

The Japanese priority application No. 2003-392201 upon which the present application is based is hereby incorporated in its entirety herein by reference.

BACKGROUND OF THE INVENTION

1. Field of the Invention

The present invention relates to a fuel cell.

2. Description of the Related Art

A conventional fuel cell includes a laminated, plate-shaped membrane electrode assembly and first and second separator plates, which sandwich the membrane electrode assembly therebetween. The membrane electrode assembly includes an electrolyte; first and second electrode layers sandwiching the electrolyte therebetween; and first and second gas-diffusion layers disposed outside the electrode layers, respectively, relative to the electrolyte. Each gas-diffusion layer is generally made of a carbon paper. However, carbon paper is typically low in strength and surface pressure resistance, and moreover, is brittle. Therefore, during formation of a stack in the conventional fuel cell, control of the surface pressure involving contact resistance reduction is extremely difficult to accomplish.

In order to eliminate such a disadvantage, Japanese Patent No. 2000-58072 disclosed a gas-diffusion layer formed from a metal mesh or a porous metallic material.

However, in such a conventional gas-diffusion layer, because the diameter of fine pores in a surface of the gas-diffusion layer on a side contacting an electrode is relatively large, portions of an electrode layer and an electrolyte bite deeply into the fine pores due to a pressing force that is generated during formation of a stack, exposing the electrolyte to damage from the gas-diffusion layer.

SUMMARY OF THE INVENTION

Accordingly, an aspect of the present invention is to provide a fuel cell wherein biting by an electrode layer into a gas-diffusion layer due to a pressing force is suppressed or prevented during formation of a stack.

According to a first feature of the present invention, there is provided a laminated, plate-shaped membrane electrode assembly and first and second separator plates sandwiching the membrane electrode assembly therebetween. The membrane electrode assembly includes an electrolyte; first and second electrode layers sandwiching the electrolyte therebetween; and first and second gas-diffusion layers disposed on the outer sides of the electrode layers, respectively, relative to the electrolyte. The first and second gas-diffusion layers are made of an air-permeable metallic material. An arithmetic average roughness Ra of a surface of the air-permeable metallic material on a side contacting the electrode is in a range of $0.1 \ \mu m \leq Ra \leq 1.0 \ \mu m$.

Because the surface roughness of the first and second gas-diffusion layers is set as described above, irregularity of the surface is reduced, which prevents the first electrode layer from biting into the first gas-diffusion layer and/or the second electrode layer from biting into the second gas-diffusion layer, due to a pressing force during formation of a stack. Thus, a fuel cell is provided wherein damage to the electrolyte by the gas-diffusion layers is prevented.

According to a second feature of the present invention, the air-permeable metallic material includes a main body formed from an aggregate of metal fibers. A coating made of a noble metal and defining the arithmetic average roughness Ra is deposited on each metal fiber in a surface of the main body on the side contacting the electrode. With the second feature, the irregularity of the surfaces of the gas-diffusion layers is reduced.

According to a third feature of the present invention, a low electric-resistance layer formed from one of copper and a noble metal is provided on each metal fiber in a surface of the main body on the side contacting the separator plate. With the third feature, the contact resistance between the first gas-diffusion layer and the first separator plate, as well as between the second gas-diffusion layer and the second separator plate, is reduced.

According to a fourth feature of the present invention, each metal fiber has a diameter d in a range of $0.1 \ \mu m \leq d \leq 10 \ \mu m$. With the fourth feature, the strength of the first and second gas-diffusion layers is secured, and the surface roughness of the gas-diffusion layers is defined within the above-described range.

According to a fifth feature of the present invention, the first and second separator plates are made of a metal. Also, the first gas-diffusion layer is thermo-compression bonded to the first separator plate, while the second gas-diffusion layer is thermo-compression bonded to the second separator plate. With the fifth feature, an electric connection between the first separator plate and the first gas-diffusion layer, as well as between the second separator plate and the second gas-diffusion layer, is extremely reliable.

According to a sixth feature of the present invention, a water-repellent layer is formed on each metal fiber. With the sixth feature, clogging of the first and second gas-diffusion layers due to produced water is prevented.

The above and other aspects, features and advantages of the invention will become apparent from the following description of the preferred embodiments taken in conjunction with the accompanying drawings.

DESCRIPTION OF THE PREFERRED EMBODIMENTS

Figure 1:
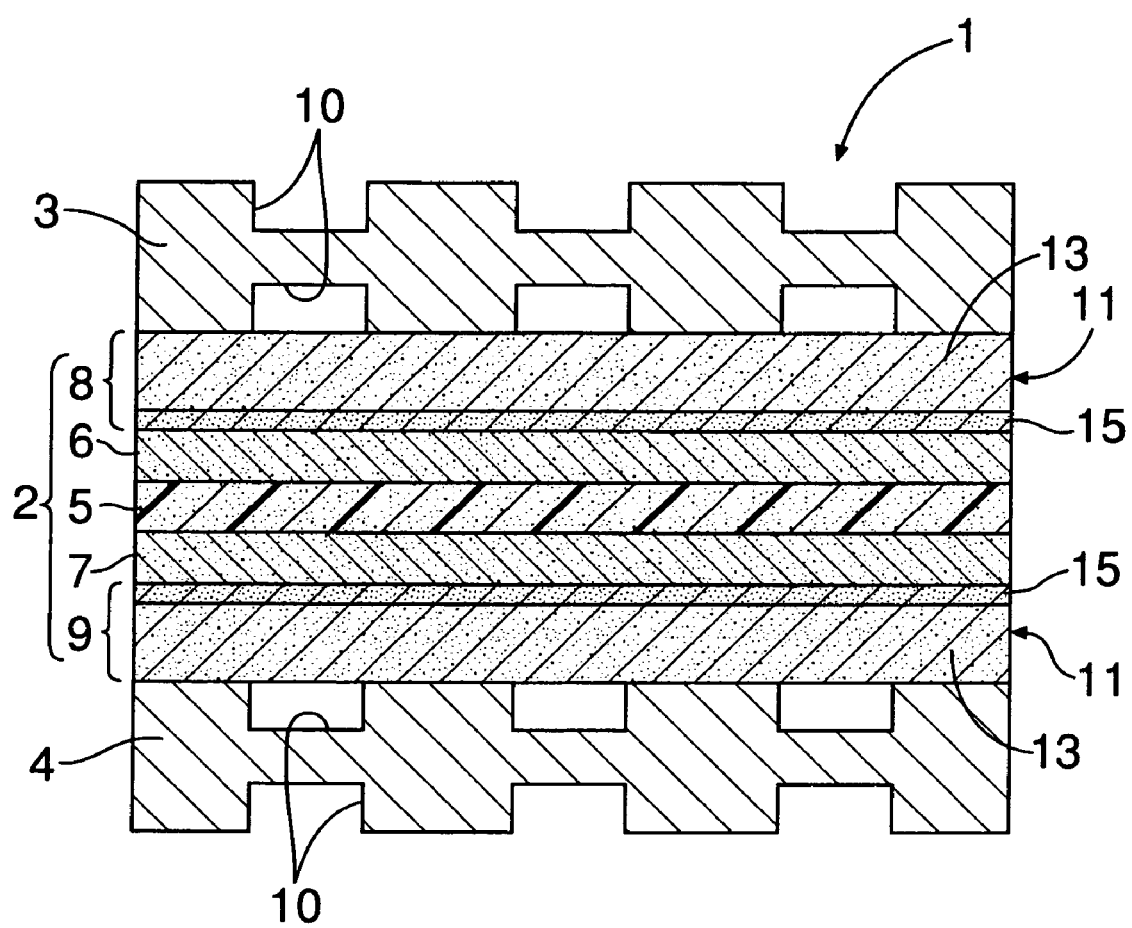
FIG. 1 is a longitudinal sectional view of a fuel cell according to a preferred embodiment of the present invention.

Referring to FIG. 1, a polymer electrolyte fuel cell 1, according to a preferred embodiment of the present invention, includes a laminated plate-shaped membrane electrode assembly 2 and an upper first separator plate 3 and a lower second separator plate 4 sandwiching the membrane electrode assembly 2 therebetween. The membrane electrode assembly 2 includes a polymer electrolyte membrane (electrolyte) 5; an upper first electrode layer 6 and a lower second electrode layer 7 sandwiching the polymer electrolyte membrane 5 therebetween; and an upper first gas-diffusion layer 8 and a lower second gas-diffusion layer 9 disposed on the outer sides of electrode layers 6 and 7, respectively, that do not sandwich the electrolyte membrane 5. The polymer electrolyte membrane 5 is made of, for example, Nafion® (manufactured by DuPont) which is a fluorocarbon resin ion exchange membrane. Each of the first electrode layer (e.g., an anode) 6 and the second electrode layer (e.g., a cathode) 7 is made of an aggregate of Pt-carried carbon particles and a polytetrafluoroethylene, which is a binder. Each of the first and second separator plates 3 and 4 is made of stainless steel and has a plurality of grooves 10 which function as gas passages.

The first and second gas-diffusion layers 8 and 9 are made of a thin air-permeable metallic material 11 having a surface roughness on a side contacting the electrode, i.e., an arithmetic average roughness Ra, in a range of $0.1\ \mu m \leq Ra \leq 1.0\ \mu m$. The thickness t of the air-permeable metallic material 11 is preferably set in a range of $0.03\ mm \leq t \leq 0.15\ mm$.

If the surface roughness of the first and second gas-diffusion layers 8 and 9 is set in the above-described range, the irregularity of the surface is reduced. Therefore, it is possible to suppress or prevent the first electrode layer 6 from biting into the first gas-diffusion layer 6 and/or the second electrode layer 7 from biting into the second gas-diffusion layer 9 due to a pressing force during formation of a stack, which prevents the polymer electrolyte membrane 5 from being damaged by the gas-diffusion layers 8 and 9. However, if the arithmetic average roughness Ra is smaller than $0.1\ \mu m$, a plurality of vent pores in the gas-diffusion layers 8 and 9 are excessively small and hinder smooth gas diffusion. On the other hand, if the arithmetic average roughness Ra is larger than $1.0\ \mu m$, the plurality of the vent pores in the gas-diffusion layers 8 and 9 are excessively large wherein the electrode layers 6 and 7 are known to likely bite into the gas-diffusion layers 8 and 9.

Figure 2:
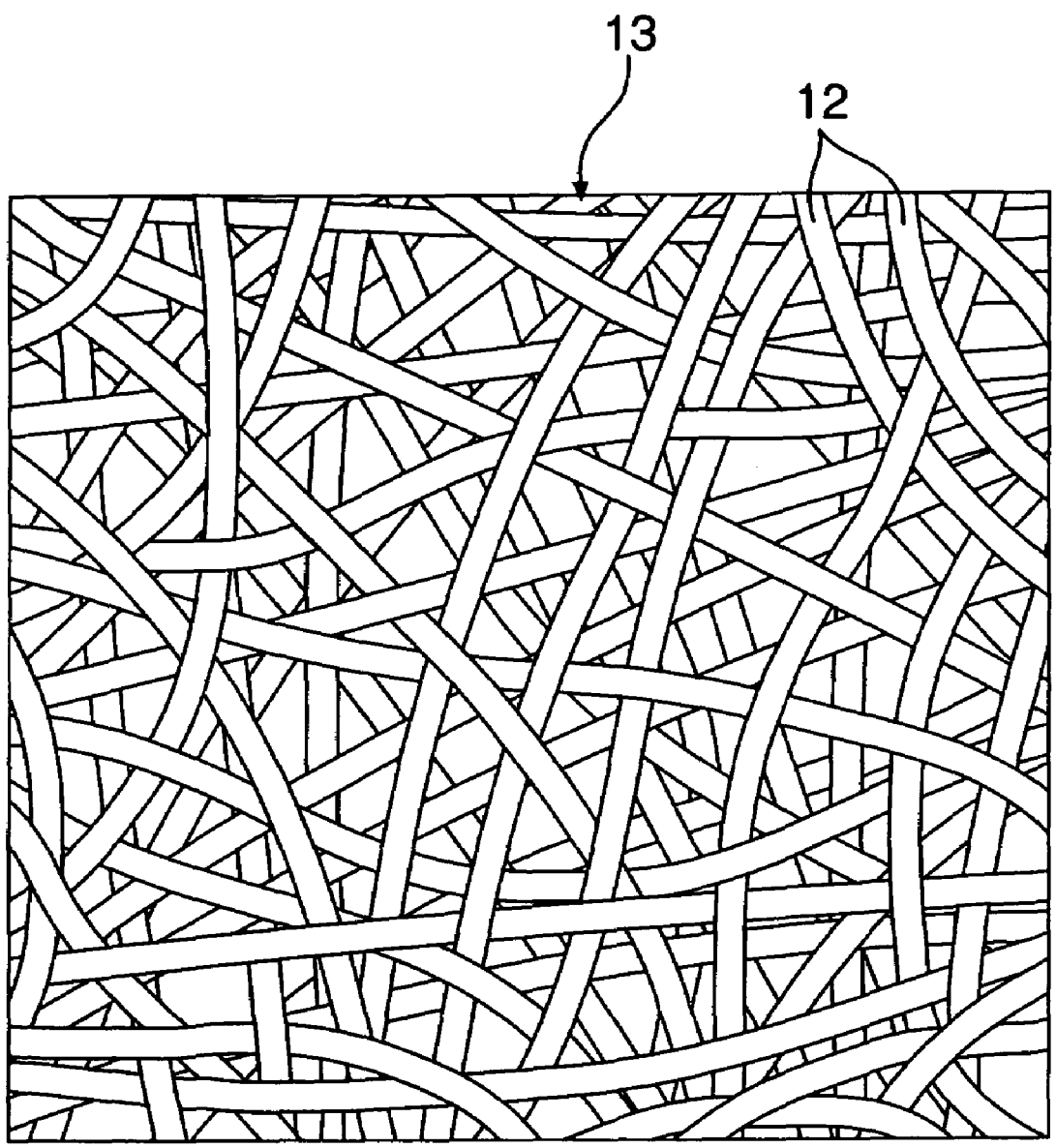
FIG. 2 is an enlarged view illustrating the plurality of metal fibers that form the main body of an air-permeable material.
Figure 3:
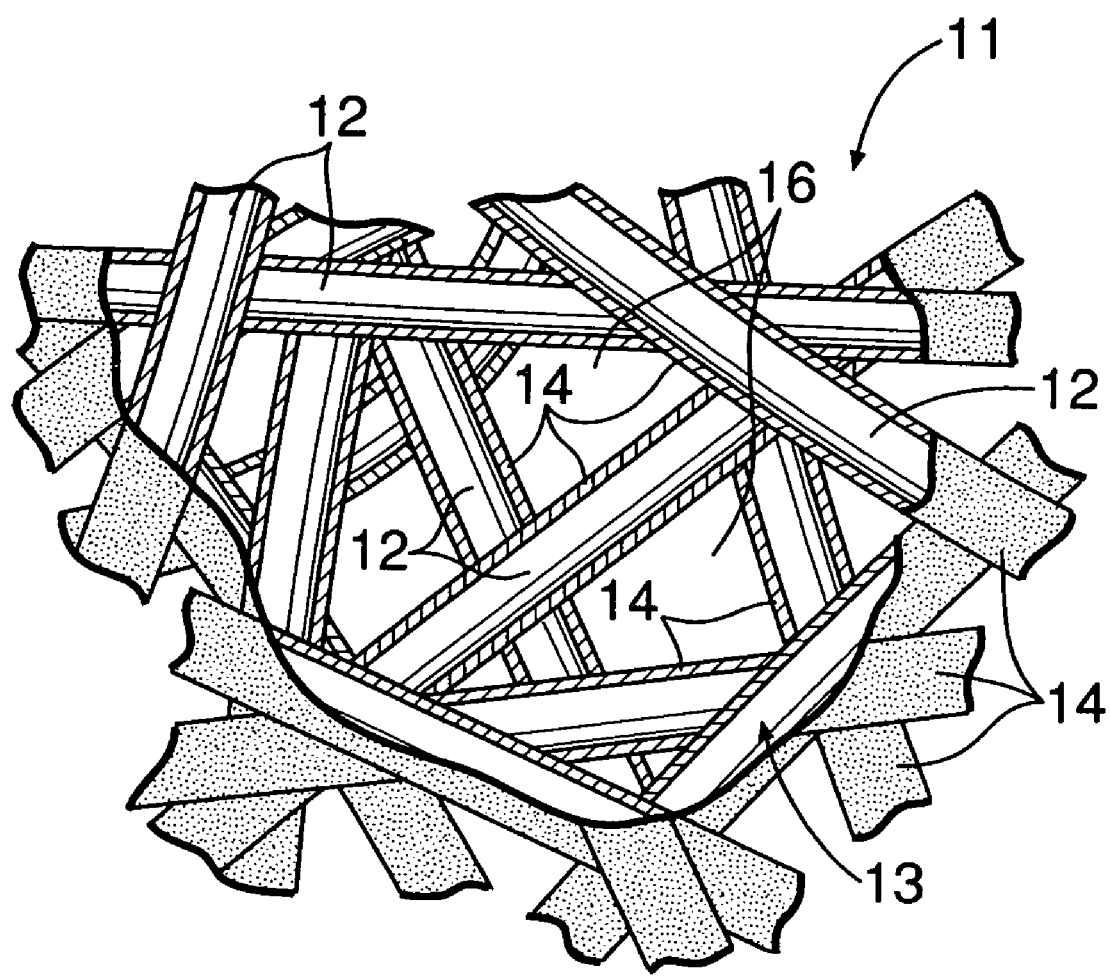
FIG. 3 is an enlarged partial cutaway plan view of the main body plating layers.

As shown in FIG. 2, the air-permeable metallic material 11 has a relatively thin main body 13, which is defined by an aggregate of metal fibers 12, e.g., stainless steel fibers. As shown in FIG. 3, in the surface of the main body 13 on the side contacting the electrode, an oxidation-resistant plating layer 14, formed from a noble metal, is deposited on each metal fiber 12. In this case, the term "vent pores 16" indicates enclosed regions surrounded by the plurality of metal fibers 12, i.e., the plating layers 14. Therefore, the plating layers 14 have a role in defining the size of the vent pores 16, i.e., the fine division of irregularity on the surface of each gas-diffusion layer 8 and 9. From the macro-viewpoint, as shown in FIG. 1, a surface layer 15 is formed on the surface of the main body 13 on the side contacting the electrode by the plurality of metal fibers 12, each fiber 12 having a plating layer 14. At least one metal selected from among gold, silver, platinum and palladium is used as the noble metal.

The main body 13 is formed from either a woven or non-woven fabric. To produce the main body 13 from a non-woven fabric, an aggregate of the metal fibers 12 is subjected to a thermo-compression bonding treatment, wherein contacting portions of intersecting or overlapping fibers 12 are diffusion-bonded to each other.

As described above, because the plating layers 14 are formed on the metal fibers 12 in the surface of the main body 13 on the side contacting the electrode, the manufacture of the main body 13 is facilitated by setting a large size of the vent pores 16, and thereafter, relatively easily setting the surface roughness within the above-described range by regulating the size of the vent pores 16 through a plating treatment. In this case, if the diameter d of the metal fibers 12 is set in a range of $0.1\ \mu m \leq d \leq 10\ \mu m$, the metal fibers 12 are prevented from breaking, which secures the strength of the first and second gas-diffusion layers 8 and 9. Also, the surface roughness of the gas-diffusion layers 8 and 9 is easily defined within the above-described range. However, if the diameter d is smaller than $0.1\ \mu m$, the metal fibers 12 are liable to break. On the other hand, if the diameter d is larger than $10\ \mu m$, the surface roughness of the gas-diffusion layers 8 and 9 cannot be defined within the above-described range.

Figure 4:
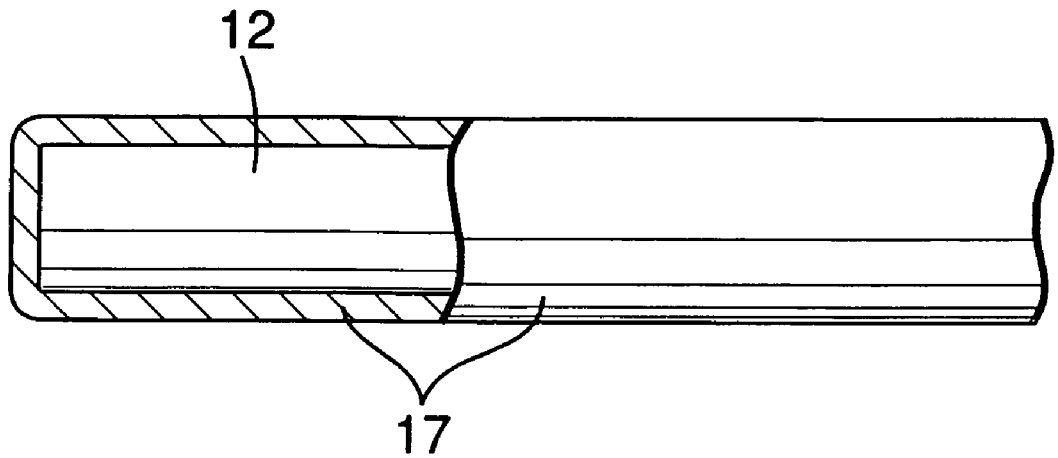
FIG. 4 is an enlarged partial cutaway front view of a metal fiber having a low electric-resistance layer.
Figure 5:
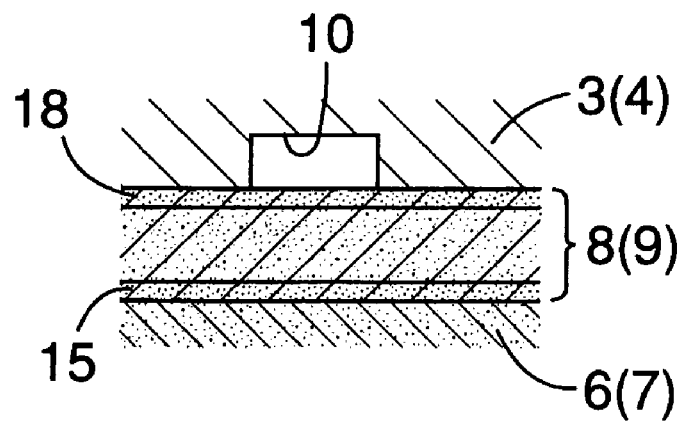
FIG. 5 is a longitudinal sectional front view of the fuel cell.

On a surface of the main body 13 on the side contacting the separator plate, a low electric-resistance layer 17, formed from one of copper and a noble metal, is provided on each of the metal fibers 12, as shown in FIG. 4. From the macro-viewpoint, a second surface layer 18 is formed on the surface of the main body 13 on the side contacting the separator plate by the plurality of metal fibers 12, each having the low electric-resistance layer 17, as shown in FIG. 5. As in the previous case, the noble metal is at least one metal selected from gold, silver, platinum and palladium. If the main body 13 is formed in this way, it is possible to reduce the contact resistance between the first gas-diffusion layer 8 and the first separator plate 3, as well as between the second gas-diffusion layer 9 and the first separator plate 4. By forming the metal fiber 12 from stainless steel, the present invention eliminates any increase in contact resistance due to a passive-state membrane.

(1) Damage to Polymer Electrolyte Membrane by Gas-Diffusion Layer

A non-woven fabric having a length of 50 mm, a width of 50 mm and a thickness (t) of 0.05 mm was fabricated using stainless steel fibers (JIS SUS316) with a diameter of $1\ \mu m$. The non-woven fabric was then subjected to punching to obtain a thin main body 13 of a disk-shape having a diameter of 15.5 mm. In this case, an arithmetic average roughness Ra of a surface of the main body 13 on the side contacting an electrode was $0.6\ \mu m$. The main body 13 was then plated with gold by an electric plating process, wherein surface layers 15 and 18, each having a thickness of $5\ \mu m$, were formed on the main body 13, respectively, on the side contacting the electrode and on the side contacting the separator plate, to form an air-permeable metallic material 11. An arithmetic average roughness Ra of a surface of the air-permeable metallic material 11 on the side contacting the electrode was approximately $0.33\ \mu m$. The measurement of the arithmetic average roughness Ra was conducted in accordance with JIS B0601-1994 using a surface roughness shape measurer (trade name "Serfcom 1400A", manufactured by Tokyo Seimitu Co., Ltd.).

Such an air-permeable metallic material 11 was used as each of the first and second gas-diffusion layers 8 and 9. The polymer electrolyte fuel cell 1 was assembled using the gas-diffusion layers 8 and 9, a disk-shaped polymer electrolyte membrane 5, first and second electrode layers 6 and 7, and first and second separator plates 3 and 4. The fuel cell 1 was placed on a base plate with the second separator plate 4 on the lower side. A load of 784N was applied for 12 hours to the fuel cell 1 from the side of the first separator plate 3. Thereafter, sections of the first and second electrode layers 6 and 7 were examined using a scanning electron microscope showing the amount each electrode layer 6, 7 was biting into the gas-diffusion layers 8 and 9, without damage to the polymer electrolyte membrane 5, was 2 μm.

(2) Contact Resistance Between Gas-Diffusion Layer and Separator Plate

Circular plates each made of a stainless steel (JIS SUS304) and having grooves of a serpentine shape on opposite flat faces were prepared as separator plates 3 and 4, respectively. A width $w_1$ of the groove 10 was 0.5 mm, and a width $w_2$ of a projection 19 defined by the adjacent groove 10 was 0.5 mm, and a region of each of the opposite flat faces excluding the grooves was plated with gold.

Figure 6:
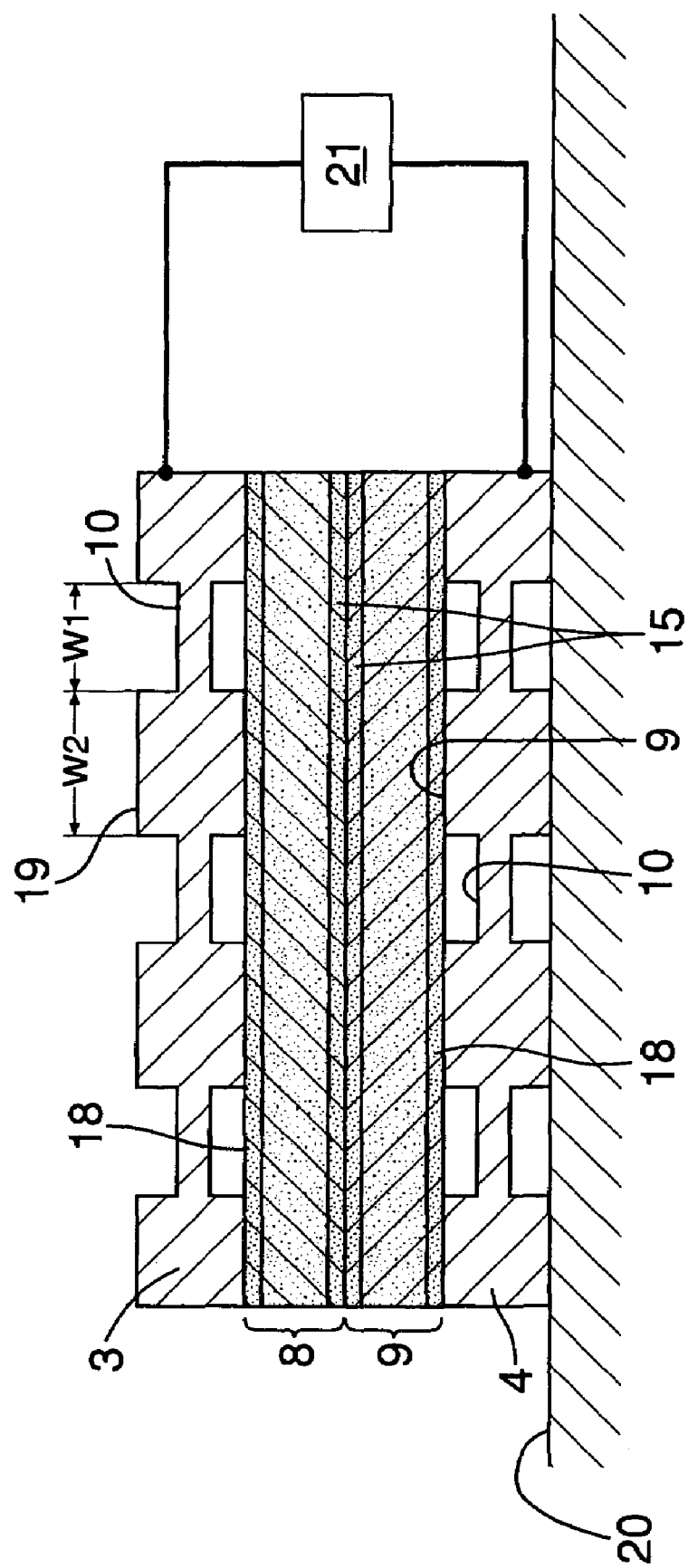
FIG. 6 is a view explaining a contact-resistance measuring method.

As shown in FIG. 6, gas-diffusion layers 8 and 9 were superposed on each other. Then, first and second separator plates 3 and 4 were disposed on the outer or free sides of the gas-diffusion layers 8 and 9, respectively. Thereafter, the resultant laminate was placed on a base plate 20 with the second separator plate 4 on the lower side. The separator plates 3 and 4 were then connected to a galvanostat 21. An electric current of 10 A was allowed to flow between the gas-diffusion layers 3 and 4 at a temperature of 100° C. in a state in which a load of 392 N was applied to the laminate from the side of the first separator plate 3. A voltage loss at that time was measured using the galvanostat 21. For comparison, a voltage loss was measured in the same manner using carbon papers subjected to a water-repellent treatment as the gas-diffusion layers. The voltage loss value in the embodiment was 2.2 mV, whereas the voltage loss value in the comparative example was 31.3 mV. Thus, it was determined that the voltage loss value in the embodiment was smaller by one figure than that in the comparative example.

Figure 7:
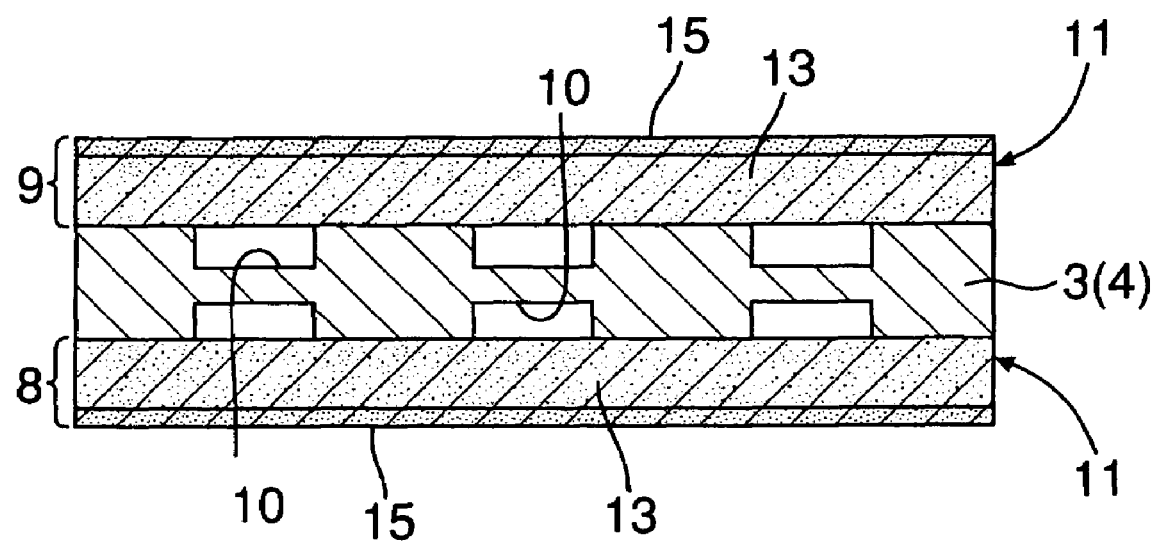
FIG. 7 is a longitudinal sectional view of a fuel cell including gas-diffusion layers which are thermo-compression bonded to separator plates.

FIG. 7 shows another embodiment of the polymer electrolyte fuel cell of the present invention, wherein first and second gas-diffusion layers 8 and 9 are thermo-compression bonded to a first separator plate 3 and to a second separator plate 4, the first and second separator plates 3 and 4 being made of a metal. The thermo-compression bonding conditions are set, for example, at 1,000° C., under $10 \times 10^6$ Pa, for one hour in a vacuum.

The separator plates 3, 4 and the gas-diffusion layers 8, 9 are diffusion-bonded to each other at a high temperature in a vacuum, wherein oxidized film is not produced on joint portions. Therefore, the electric contact is good, and gold plating at the joint portions is omitted.

In the above-described case, where the thermo-compression bonding is employed, if the first and second gas-diffusion layers 8 and 9 are thinned upon demand for compactness, the gas diffusion is degraded in the joint portions j between the projections of the first and second separator plates 3, 4 and the first and second gas-diffusion layers 8, 9.

Figure 8:
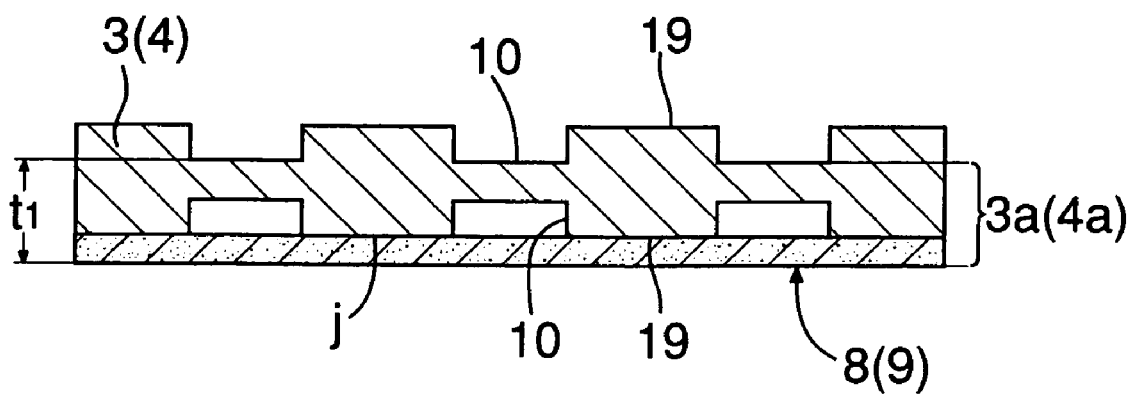
FIG. 8 is a longitudinal sectional front view of a comparative example, showing a first (second) separator plate and a first (second) gas-diffusion layer in a bonded state.
Figure 9:
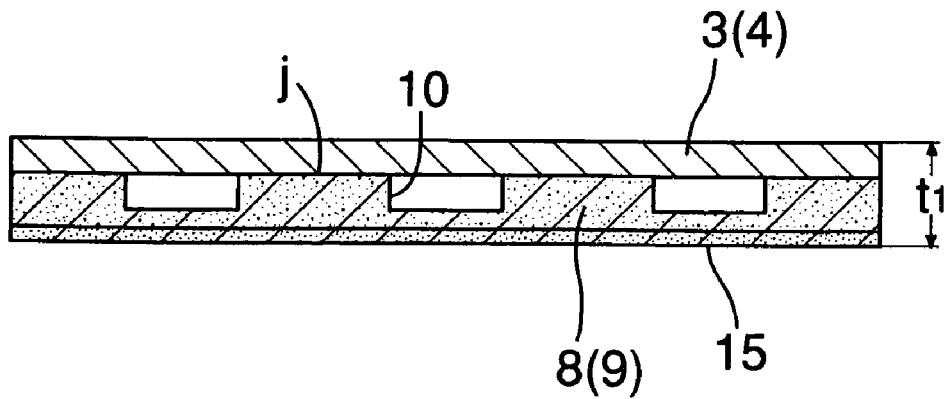
FIG. 9 is a longitudinal sectional front view of a first (second) separator plate and a first (second) gas-diffusion layer in a bonded state according to a second embodiment of the present invention.

In order to eliminate this drawback, in an embodiment shown in FIG. 9, first and second separator plates 3 and 4 are formed to have a smaller thickness, while first and second gas-diffusion layers 8 and 9 are formed to have a larger thickness, and grooves 10 are formed in the gas-diffusion layers 8 and 9. In this case, a total thickness $t_1$ of the first separator plate 3 (the second separator plate 4) and the first gas-diffusion layer 8 (the second gas-diffusion layer 9) is equal to a total thickness $t_1$ of the first gas-diffusion layer 8 (the second gas-diffusion layer 9) and a portion 3a (4a) of the first separator plate 3 (the second separator plate 4) corresponding to the first gas-diffusion layer 8 (the second gas-diffusion layer 9) in the comparative example shown in FIG. 8.

Thus, compactness is achieved, and gas diffusion can be made unrelated to the joint portions j to be improved. In fabricating the first and second gas-diffusion layers 8 and 9 to have grooves 10, the projections 19 are formed by laminating non-woven fabrics or by press forming.

Figure 10:
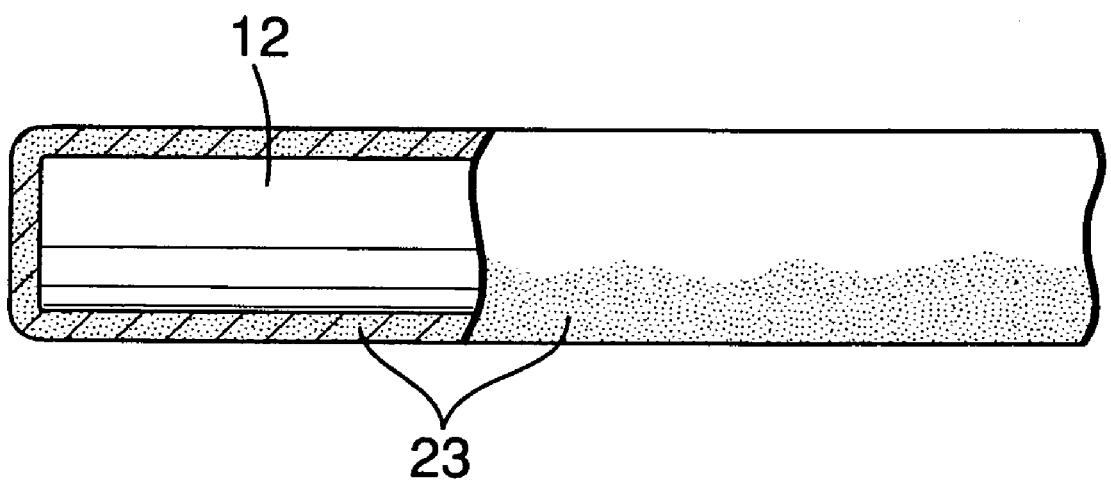
FIG. 10 is a cutaway front view of a metal fiber having a water-repellent layer according to a third embodiment of the present invention.

In a fuel cell, under operational conditions such that produced water is discharged in a liquid phase, e.g., under conditions of ambient pressure at 100° C. or less, there is a fear that the produced water will clog the gas-diffusion layers 8 and 9. To avoid this, it is necessary to impart water-repellency to the gas-diffusion layers 8 and 9. Thus, a water-repellent layer 23 is formed to cover an air-permeable metallic material 11, i.e., a plurality of metal fibers 12 having plating layers 14 and/or low electric-resistance layers 17 which form a main body 13, as shown in FIG. 10. The water-repellent layer 23 includes, for example, PTFE whose content is, for example, 10% by weight. The water-repellent layer 23 is prepared by, for example, impregnating the permeable metallic material 11 with a PTFE dispersion, and drying the metallic material 11, followed by heating at 340° C. for 30 minutes.

Although preferred embodiments of the present invention have been described in detail, it will be understood that various modifications may be made without departing from the scope and spirit of the invention recited in the claims attached hereto.

What is claimed is:

1. A fuel cell comprising:
   a laminated, plate shaped membrane electrode assembly including:
      an electrolyte,
      first and second electrode layers sandwiching the electrolyte therebetween, and
      first and second gas-diffusion layers disposed on an outer side of, respectively, the first and second electrode layers, remote from the electrolyte;
   a first separator plate; and
   a second separator plate, wherein the first and second separator plates sandwich the membrane electrode assembly therebetween,
   wherein the first and second gas-diffusion layers are made of an air-permeable metallic material,
   wherein an arithmetic average roughness Ra of a surface of the air-permeable metallic material contacting one of the first and second electrode layers is in a range of 0.1 μm≦Ra≦1.0 μm, and
   wherein the air-permeable metallic material comprises a main body defined by a plurality of metal fibers, and wherein a coating made of a noble metal and defining the arithmetic average roughness Ra is formed on each metal fiber on a surface of the main body contacting one of the first and second electrode layers.

2. The fuel cell according to claim 1, wherein a low electric-resistance layer formed from one of copper and a noble metal is formed on each metal fiber on the surface of the main body contacting one of the first and second electrode layers.

3. The fuel cell according to claim 2, wherein each metal fiber has a diameter d in a range of 1 μm≦d≦10 μm.

4. The fuel cell according to claim 3, wherein the first and second separator plates are metal, wherein the first gas-diffusion layer is thermo-compression bonded to the first separator plate, and wherein the second gas-diffusion layer is thermo-compression bonded to the second separator plate.

5. The fuel cell according to claim 4, wherein a water-repellent layer is formed on the air-permeable metallic material.

6. The fuel cell according to claim 2, wherein a water-repellent layer is formed on the air-permeable metallic material.

7. The fuel cell according to claim 3, wherein a water-repellent layer is formed on the air-permeable metallic material.

8. The fuel cell according to claim 1, wherein each metal fiber has a diameter d in a range of $1\ \mu m \leqq d \leqq 10\ \mu m$.

9. The fuel cell according to claim 8, wherein the first and second separator plates are metal, wherein the first gas-diffusion layer is thermo-compression bonded to the first separator plate, and wherein the second gas-diffusion layer is thermo-compression bonded to the second separator plate.

10. The fuel cell according to claim 9, wherein a water-repellent layer is formed on the air-permeable metallic material.

11. The fuel cell according to claim 8, wherein a water-repellent layer is formed on the air-permeable metallic material.

12. The fuel cell according to claim 1, wherein the first and second separator plates are metal, wherein the first gas-diffusion layer is thermo-compression bonded to the first separator plate, and wherein the second gas-diffusion layer is thermo-compression bonded to the second separator plate.

13. The fuel cell according to claim 12, wherein a water-repellent layer is formed on the air-permeable metallic material.

14. The fuel cell according to claim 1, wherein a water-repellent layer is formed on the air-permeable metallic material.

* * * * *